INVENTOR.
HAROLD P. HILL
BY James J. Williams
HIS ATTORNEY

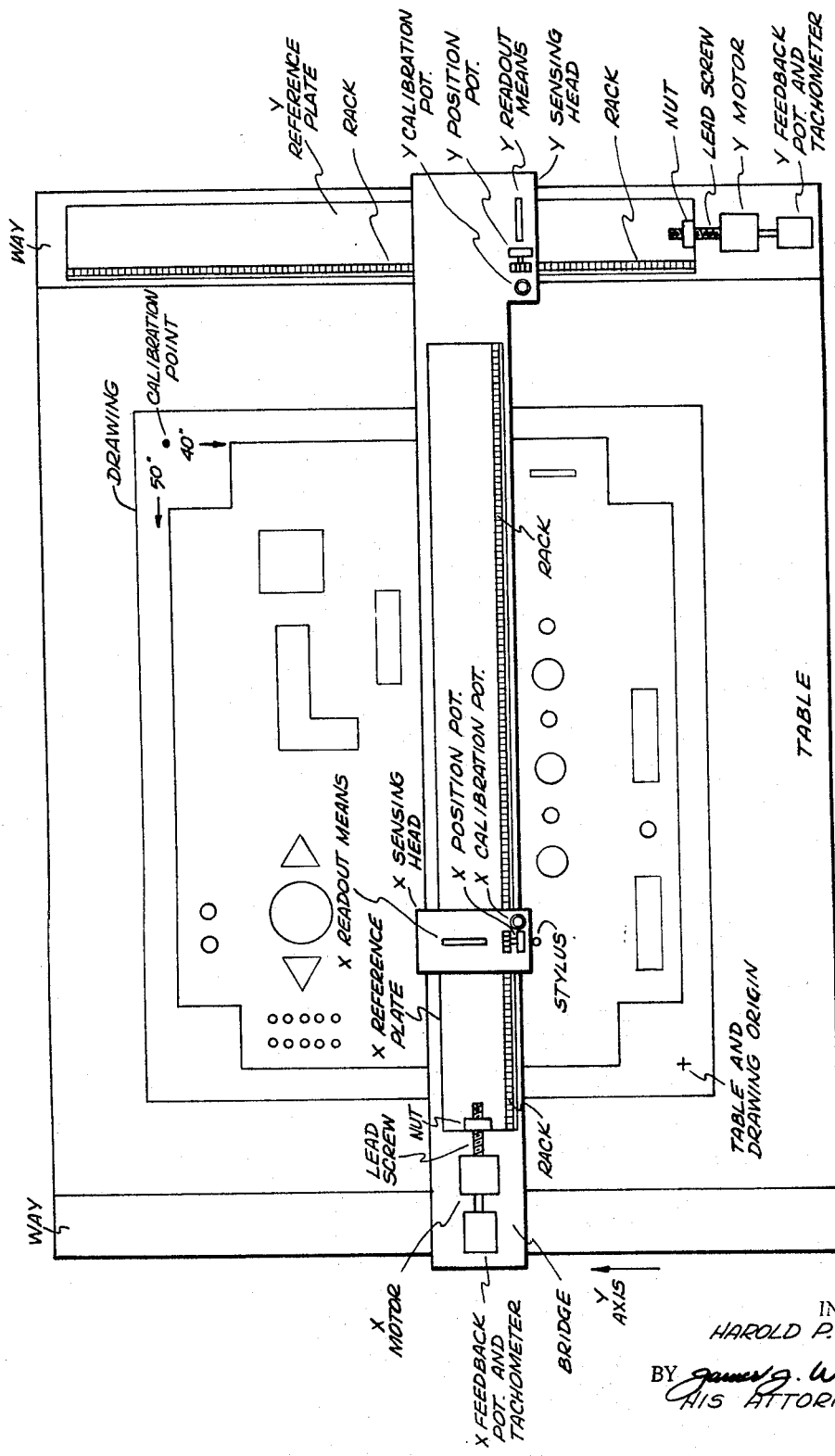

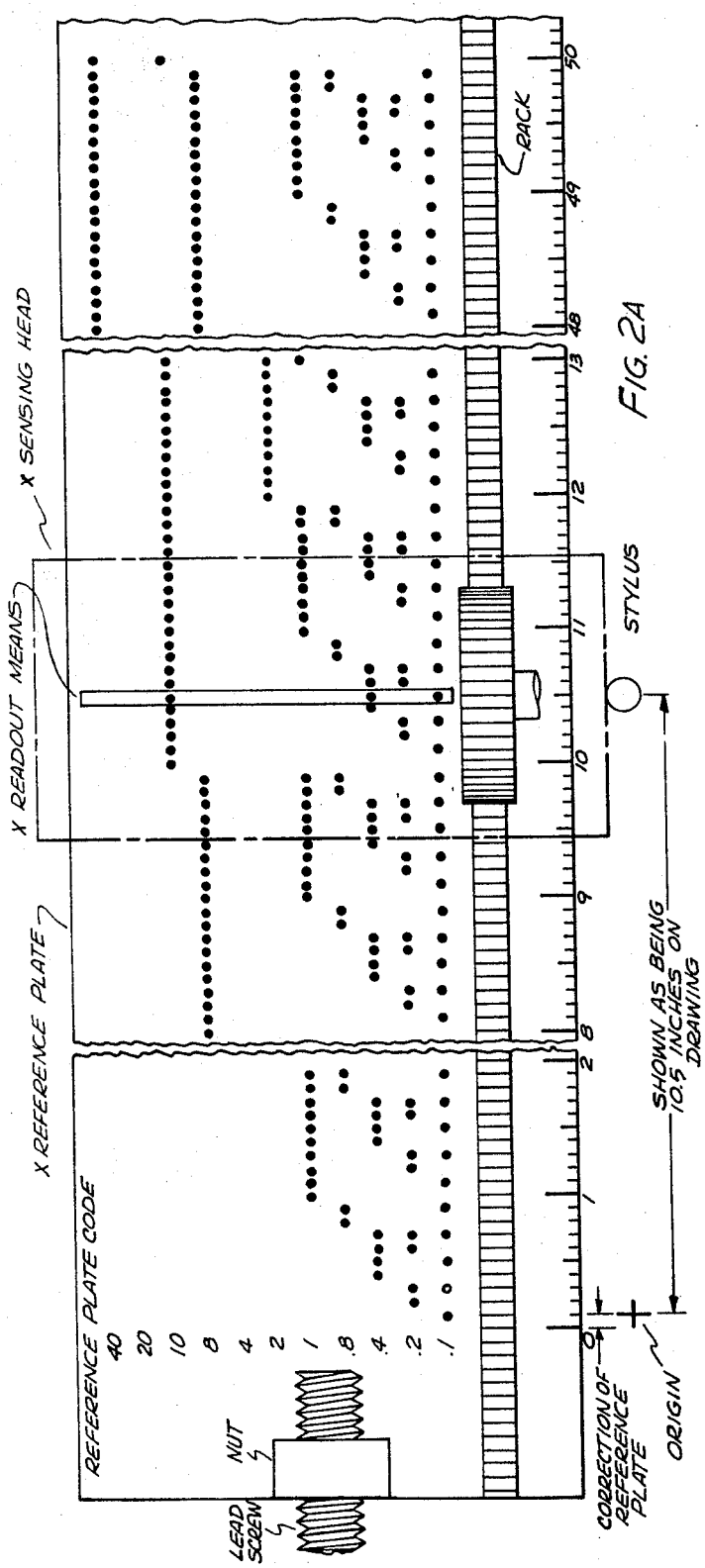
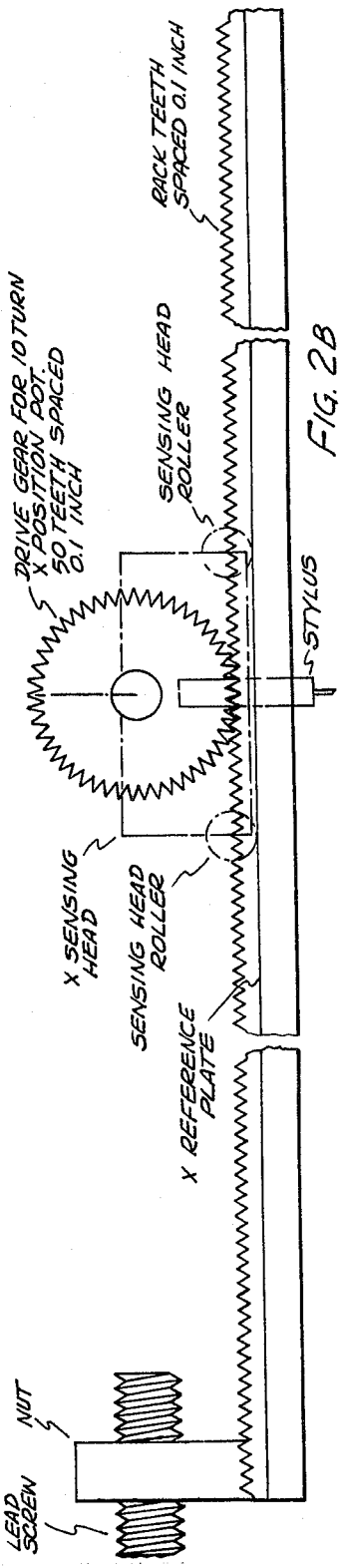
FIG. 2A
FIG. 2B

July 23, 1968     H. P. HILL     3,394,291
COMPENSATION FOR SERVOMECHANISM
Filed May 19, 1964     5 Sheets-Sheet 4

INVENTOR.
HAROLD P. HILL
BY James J. Williams
HIS ATTORNEY

United States Patent Office 3,394,291
Patented July 23, 1968

3,394,291
COMPENSATION FOR SERVOMECHANISM
Harold P. Hill, Jamesville, N.Y., assignor to General
Electric Company, a corporation of New York
Filed May 19, 1964, Ser. No. 368,524
8 Claims. (Cl. 318—18)

ABSTRACT OF THE DISCLOSURE

The invention converts the actual information of an object relative to a reference point to intended information of an object relative to the reference point. An adjustable reference element is calibrated from maximum error between the intended information and the actual information. The reference element is adjusted in accordance with the object position relative to the reference point. When the reference element is so adjusted, true and intended information may be derived from the reference element. Or, the invention may convert from intended information to actual information.

---

The invention relates to an information converting device, and particularly to a device for converting information from a first form to a second form, where one form is an actual position of an object relative to a reference point and the other form is a true and intended position of the object relative to the reference point.

Manufacturing techniques now include drawings or models and a programming device which are used to prepare numerical data. This numerical data may be supplied to a numerical positioning control or to a numerical contouring control for controlling a machine that performs some function relative to the drawing or model. Such techniques are illustrated by the punching of component mounting holes, clearance and access holes, and ventilation holes at exact positions in a piece of sheet metal that is to be made into a chassis. A drawing of the chassis and various holes is made, such a drawing usually being a full scale drawing. The drawing is placed on the programming device so that the drawing origin and the programming device origin are coincident and so that the drawing axes are parallel to the programming device axes. Usually, the programming device has two perpendicular axes. The programming device has a locator, such as a stylus, that can be moved along the perpendicular axes by an operator. Means are associated with the locator to produce signals that indicate the distance along the respective axes between the locator and the origin. The operator moves the locator to each point on the drawing at which a function or operation is to be performed on the piece of sheet metal. At each such point, the operator causes the programming device to provide signals, these signals indicating the distance of the point along both axes from the origin. The operator may also cause the programming device to provide a signal that indicates the function or operation that is to take place at the point. The signals indicating the axial distance of the point from the origin and the signal indicating the function or operation at the point may be utilized in a number of ways. One way is to record the signals on some medium, such as by punching paper tape. These recorded signals may be used with a numerical positioning control that causes a piece of sheet metal and a punch to move relative to each other and stop at various points. At these various points, the punch is operated and performs the various functions or operations. Another way is to utilize the signals immediately with such a numerical positioning control.

An object of the invention is to provide an improved device for converting information in a first form to information in a second form, where one form is an actual position of an object relative to a reference point and the other form is a true and intended position of the object relative to the reference point.

The drawings mentioned in the illustration above are usually prints made from a master drawing. When made, these prints may become physically distorted, such as shrinking in one dimension and stretching in the other dimension. Or, the print may shrink in both dimensions or stretch in both dimensions. If the operator positions the locator on the basis of such a print, the position indicated by the programming device will be inaccurate.

Therefore, another object of the invention is to provide a device for converting actual position information to true and intended position information.

Another object of the invention is to provide a device that can be initially adjusted for dimensional inaccuracies of a drawing or model, and that thereafter provides true and intended information with respect to any point on the drawing or model.

Another object of the invention is to provide a programming device that is adjusted for the maximum oversize or undersize along each axis or dimension of a drawing or model, and that provides true and intended position information for any point on each axis or dimension.

In some manufacturing techniques, information as to true and intended position may be available for making a part or object. But, the information must be utilized (usually with a control) in connection with a part or object that is physically oversize or undersize, or that is oversize in one or more dimensions and undersize in one or more dimensions.

Accordingly, another object of the invention is to provide a device for converting true and intended information into actual information.

Another object of the invention is to provide a device for converting information that indicates true and intended position along one or more dimension or axes of an object into information that is modified in accordance with maximum deviations of the actual object dimensions from the true and intended object dimensions.

Another object of the invention is to provide a control that receives true and intended position information along one or more dimensions or axes and that adjusts the position transducers of the control in accordance with the maximum difference between actual dimensions of an object and intended dimensions of the object, and in accordance with the controlled position of the object.

These and other objects of the invention are achieved in accordance with the following brief description. A respective adjustable reference element is provided for each axis or dimension along which the object moves. Each reference element is adjusted in the proper sense or direction for the maximum deviation between the true and intended position of the object relative to a reference point and the actual position of the object relative to the reference point. This adjustment for maximum deviation is indicated by a calibration signal. A respective feedback element is coupled to each reference element for producing a feedback signal that indicates the adjustment of the reference element. A respective position transducer for each axis or dimension is coupled to the object and produces a position signal derived from a respective calibration signal. This position signal indicates the value of the calibration signal as modified by the relative position of the object and the reference point. A servo device is coupled to the feedback element and the position transducer to adjust the reference element in accordance with the feedback signal and the position signal. The adjusted reference element provides the true and intended information when the information form conversion is from actual information to true and intended information. Or, the adjusted reference element provides the actual information when the information form conversion is from true and intended information to actual information.

The invention is particularly pointed out in the claims. The invention may be better understood from the following description given in connection with the accompanying drawing, in which:

FIGURE 1 shows a programming device that utilizes one embodiment of an information converting device in accordance with the invention;

FIGURES 2A and 2B show enlarged views of certain parts of the information converting device of FIGURE 1;

Description

Figure 3:
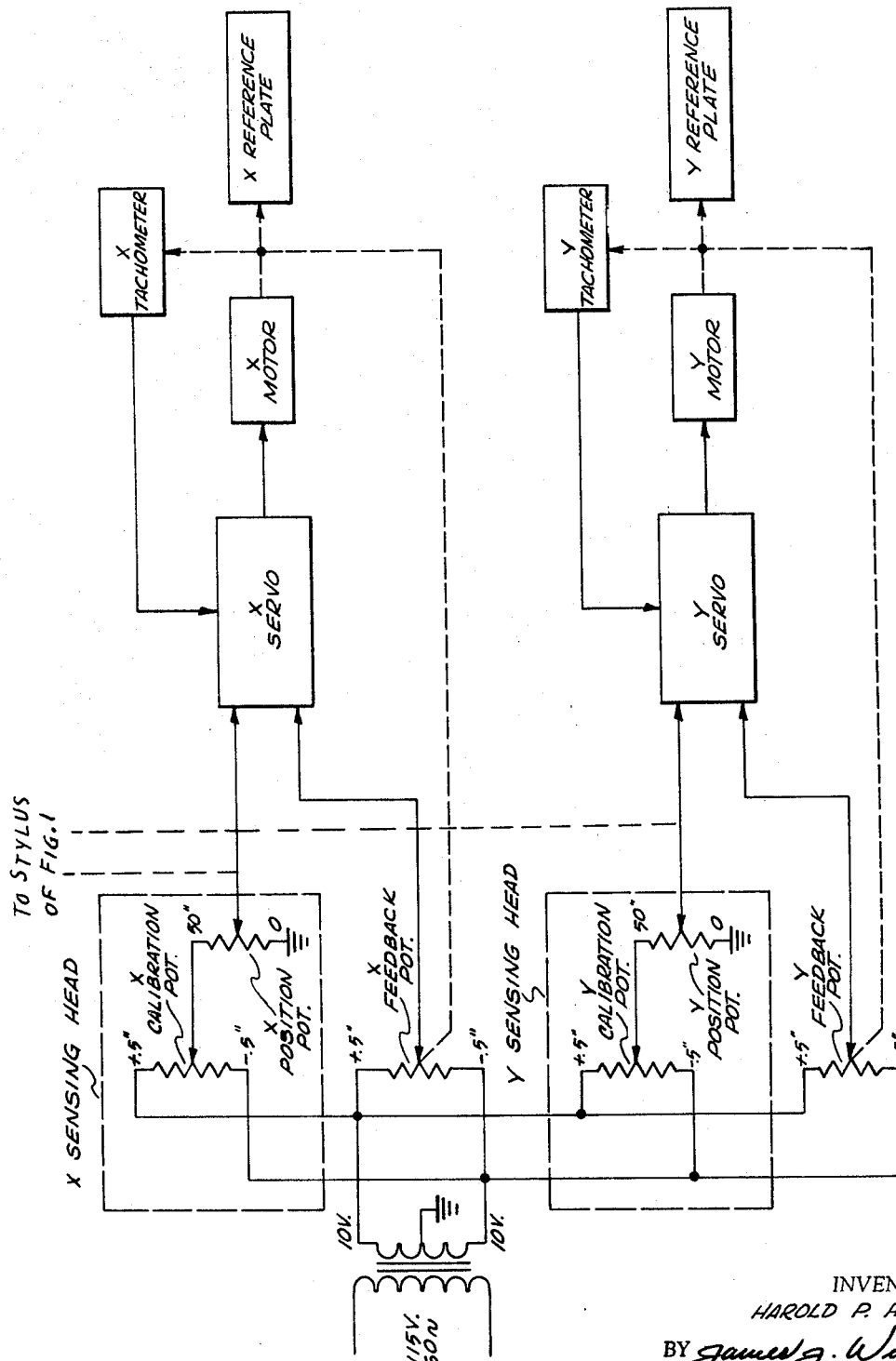
FIGURE 3 shows a diagram of the information converting device of FIGURES 1 and 2.

A programming device for converting actual information in a drawing to true and intended information has been selected as an example for explaining the information converting device of the invention. Such a programming device is shown in plan view in FIGURE 1. The programming device includes a table on which two ways are positioned. The ways are located at the left and right sides of the table and extend parallel to the arbitrarily designated Y axis. The ways support a bridge which can move back and forth on suitable rollers over the ways. A Y sensing head is positioned at the right-hand end of the bridge. The Y sensing head includes a Y calibration potentiometer (abbreviated POT. in the drawing), a Y position potentiometer, and Y read out means. The Y sensing head moves parallel to the Y axis over a Y reference plate which is positioned on the right-hand way. As the Y sensing head is moved, a gear is turned by engagement with teeth of a rack on the Y reference plate. Or, the rack may be on the right-hand way. This gear is coupled to and turns the Y position potentiometer. The Y reference plate may be moved parallel to the Y axis with respect to its way by means of a Y motor which is fastened to the way. The Y motor turns a lead screw which threads into a nut fastened on the Y reference plate. The Y motor also operates a Y feedback potentiometer and tachometer.

A similar X sensing head is positioned on the bridge. The X sensing head includes X readout means, an X position potentiometer, and an X calibration potentiometer. The X sensing head moves back and forth on suitable rollers over the bridge and X reference plate. This motion is parallel to the X axis. As the X sensing head is moved, a gear is turned by engagement with teeth of a rack on the X reference plate. Or, the rack may be on the bridge. This gear is coupled to and turns the X position potentiometer. The X reference plate may be moved parallel to the X axis with respect to the bridge by means of the X motor which is fastened to the bridge. The X motor turns a lead screw which threads into a nut fastened on the X reference plate. The X motor also drives an X feedback potentiometer and tachometer.

The X sensing head includes a locator or stylus which an operator positions at various points on a drawing. A drawing is shown on the table in FIGURE 1, and is positioned between the ways and beneath the bridge so that the stylus can be positioned at any point with respect to the drawing. The drawing is a typical one which shows a developed view of a chassis with various holes positioned on it. A chassis such as shown in the drawing is made from a piece of sheet metal which is stamped or punched or drilled to provide the indicated holes. Then the sheet metal would be bent along its four sides to form the chassis.

FIGURES 2A and 2B show more detailed views in plan and elevation of the X reference plate and sensing head. The Y reference plate and sensing head may be similar, and hence are not shown in detail. The X reference plate is movably positioned on the bridge, and is moved by the X motor turning the lead screw which engages the nut. The nut is firmly attached to the X reference plate. In the figures which illustrate the invention, it has been assumed that the table is intended to accommodate a drawing which has dimensions up to 50 inches along the X axis and 40 inches along the Y axis. It has also been assumed that the dimensional undersize or oversize of the drawing does not exceed one-half (0.5) inch in any one dimension. It is to be understood that other sizes of drawing and oversize and undersize can be accommodated. The X reference plate is therefore at least 50 inches long. As shown in FIGURE 2A, the X reference plate has been broken in two places so as to accurately and clearly show the dimensions from 0 to 2 inches, 8 to 13 inches, and 48 to 50 inches. These dimensions are indicated in the scale shown at the bottom of the X reference plate. The X reference plate also includes a binary decimal code in the form of holes which can receive pins or pass light, and thus be sensed. This code is positioned or located on the X reference plate so that the X readout means on the X sensing head can read or sense the position of the stylus on the X sensing head in binary coded decimal form. Other codes and arrangements can be used. The reference plate code is indicated at the left, and it will be seen that a combination of holes along a transverse line with respect to the X reference plate indicates the position at any point on the X reference plate to an accuracy of one-tenth (0.1) inch. Different arrangements that provide greater or less accuracy may be provided. The X readout means is indicated by the solid line rectangle above and in transverse line with the stylus. It will be seen that a hole appears for the reference plate code of 10, 0.4, and 0.1 inches, this being a distance of 10.5 inches. The X readout means may comprise any known device, such as pins which can drop into the holes in the X reference plate or photoelectric light sensing means which sense light which passes through the holes in the X reference plate. This information may be utilized to provide a punched paper tape or to control a numerical control directly.

The X sensing head moves longitudinally along the X reference plate on sensing head rollers. The sensing head and rollers are shown in phantom. The X sensing head carries a drive gear for a ten turn X position potentiometer. This drive gear is provided with 50 teeth spaced on 0.1 inch centers which engage the rack teeth also spaced on 0.1 inch centers. Thus, the drive gear makes a complete revolution for every five inches of travel of the X sensing head. For a ten turn potentiometer, this would cause the X position potentiometer to travel from one end to the other over the full 50 inches of travel of the X sensing head. A single turn position potentiometer could also be used if appropriate gears were provided. Thus, the drive gear shown in FIGURE 2B could be geared down so that the single turn potentiometer revolved once for the full 50 inches of travel.

FIGURE 3 shows a diagram of an information converting device in accordance with the invention. The information converting device may be supplied with 115 volts, 60 cycle alternating current power which is stepped down to an appropriate voltage by an input transformer 10. A convenient voltage is 10 volts at each end of the secondary winding with respect to a grounded center tap. The X and Y portions of the diagram of FIGURE 3 are similar, so that only the X portion will be described. The stepped down voltage is applied to the X sensing head at the X calibration potentiometer. This voltage is also supplied to the X feedback potentiometer. The tap of the X calibration potentiometer is coupled to one end of the X position potentiometer. The other end of the X position potentiometer may be grounded. The X position potentiometer is thus provided with a voltage or signal that depends on the setting of the X calibration potentiometer. A position signal or voltage is derived from the X position potentiometer and applied to an X servo. A feedback signal or voltage is derived from the X feedback potentiometer and applied to the X servo. The X servo compares these two signals and produces a signal which causes the X motor to revolve in one direction or the other dependent upon the comparison. As the X motor revolves, it drives the X reference plate in an appropriate direction and also moves the X feedback potentiometer in a direction which tends to cause the X feedback signal to be equal to the X position signal. (The mechanical motion of the motor is indicated by the dashed lines.) When these signals are equal, the X motor stops. The X motor is also provided with an X tachometer which provides a speed signal that is supplied to the X servo for improving the operation of the X servo. The X feedback potentiometer may be a multi-turn potentiometer that is suitable for the gearing that drives the X reference plate and the distance the X reference plate must travel. If the drawing may be oversize or undersize by one-half (0.5) inch, the X reference plate must move one inch. If the lead screw connecting the X motor to the nut on the X reference plate has a pitch of one-tenth (0.1) inch, the lead screw must revolve ten times to produce the needed range of travel of the X reference plate. The X feedback potentiometer may be a ten turn potentiometer coupled to the same lead screw. Or, other gearing may be coupled between the X motor and an X feedback potentiometer of one turn so that the X feedback potentiometer makes one turn as the X reference plate travels the needed range.

It will be seen that the voltages on the taps of the X calibration and feedback potentiometers vary with the position of the taps. If a tap is centered, it has zero volts. If a tap is moved upward from the center, it has an increasing voltage magnitude of positive sense or polarity. If a tap is moved downward from the center, it has an increasing voltage magnitude of negative sense or polarity.

Figure 4:
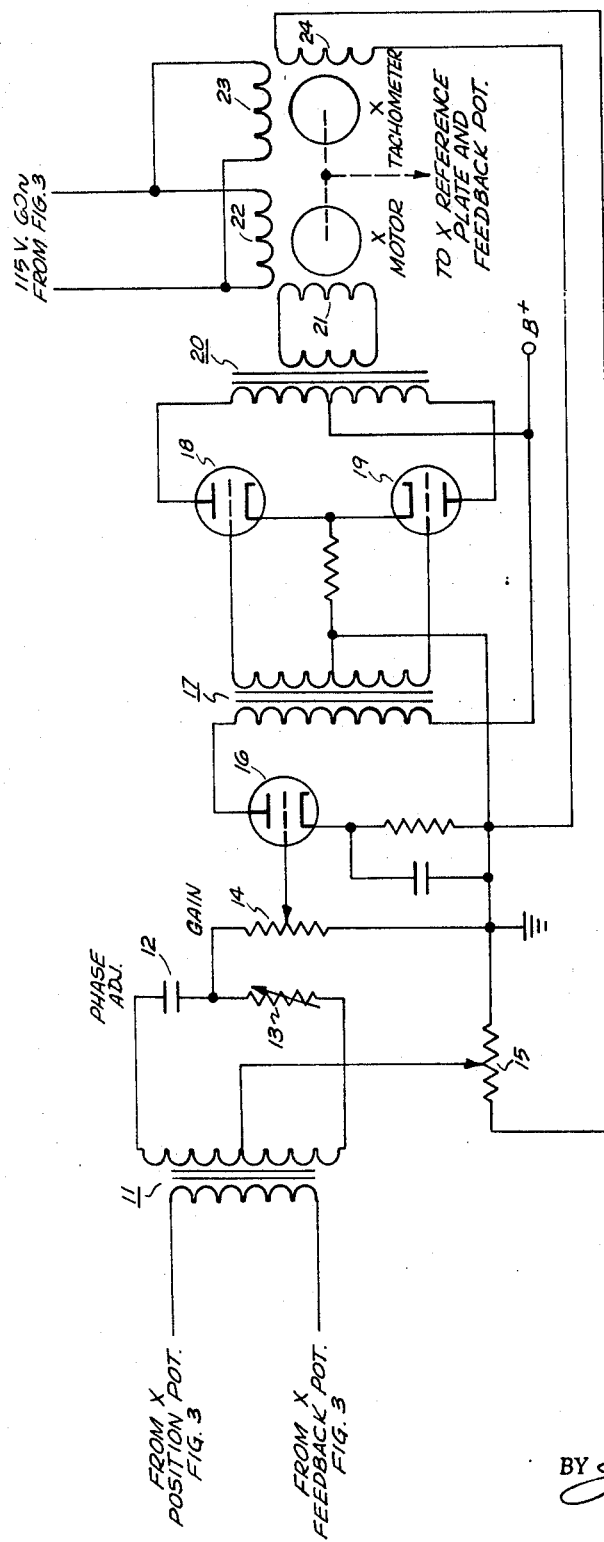
FIGURE 4 shows a diagram of a servo which can be utilized in the information converting device of FIGURES 1, 2, and 3.

FIGURE 4 shows a diagram of a servo which could be used for the X servo as indicated, and which could also be used for the Y servo. The X servo shown in FIGURE 4 is an alternating current type servo, since such a servo is suitable for the purpose intended. However, a direct current type servo could be used. The signals from the X position potentiometer and the X feedback potentiometer are supplied to the primary winding of an input transformer 11. The secondary winding of this transformer is coupled to a phase adjusting circuit comprising a capacitor 12 and an adjustable resistor 13. The center tap of the secondary winding of the input transformer 11 is coupled to a tachometer potentiometer 15 as will be explained below. The junction of the capacitor 12 and adjustable resistor 13 is coupled to one end of a gain potentiometer 14. The other end of the gain potentiometer 14 is coupled to ground. The movable tap of the gain potentiometer 14 is coupled to the grid of an amplifier device such as the triode vacuum tube 16 shown. The output of the vacuum tube 16 is coupled to the primary winding of a transformer 17, this winding being coupled to a source of direct current potential B+ that is positive with respect to ground. The secondary winding of the transformer 17 is provided with a center tap and output connections for push-pull operation with amplifier devices such as the two triode vacuum tubes 18, 19. The output from these tubes 18, 19 is coupled to the primary winding of an output transformer 20. The center tap of this primary winding is coupled to the source of potential B+. The secondary winding of the output transformer 20 is coupled to the control field 21 of the X motor. The X motor is an alternating current type motor having a reference field 22 supplied with the same 115 volts, 60 cycle alternating current that is supplied to the input transformer 10 in FIGURE 3. The mechanical output of the X motor is indicated by the dashed line, and as shown drives the X tachometer and moves the X reference plate and the X feedback potentiometer. The X tachometer has a reference field 23 so that its output winding 24 produces an alternating current having a phase related to the direction of rotation of the X motor and tachometer and a magnitude indicative of the speed of such rotation. This output signal is supplied to the tachometer potentiometer 15 to provide improved servo operation.

*Operation*

Figure 5:
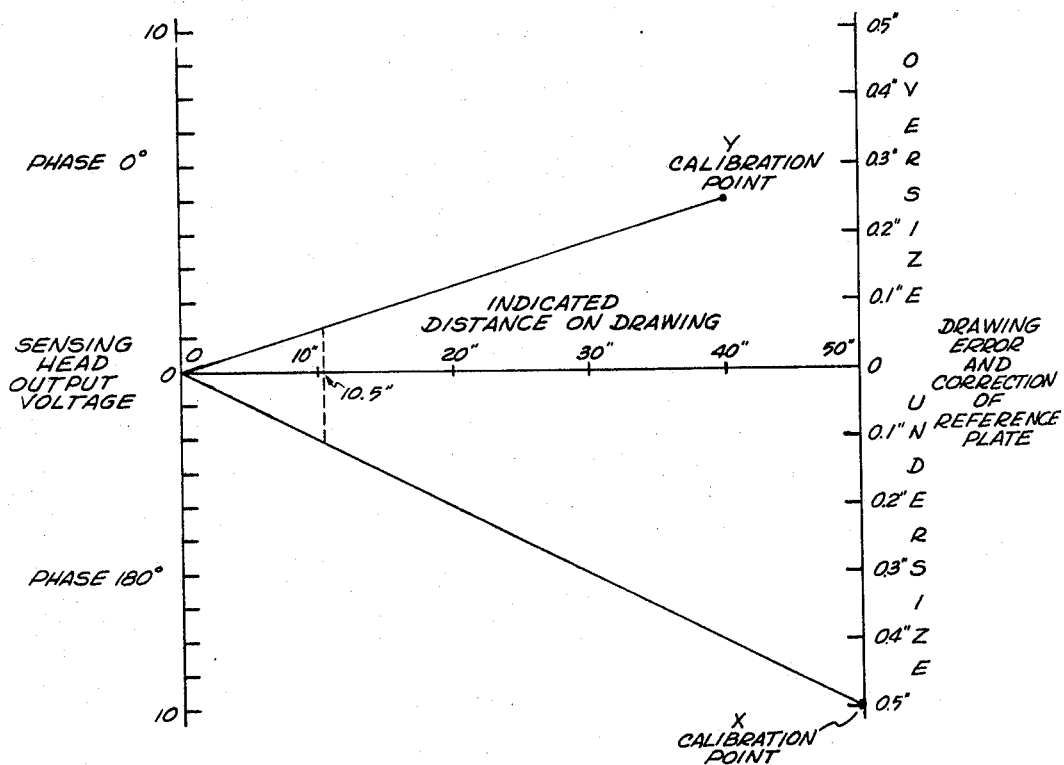
FIGURE 5 shows a graph for explaining the operation of the information converting device of FIGURES 1, 2, 3, and 4.

The operation of the information converting device will be described in connection with the graph of FIGURE 5 and also with reference to the other figures. The graphs of FIGURE 5 have been drawn on the assumption that a drawing approximately 50 inches long in the X dimension and 40 inches long in the Y dimension is being programmed, and that the drawing is 0.5 inch undersize in the X dimension and 0.25 inch oversize in the Y dimension. The operator places the drawing on the table so that the table and drawing origins coincide and so that the X and Y dimensions of the drawing are parallel to the X and Y axes of the table. The stylus is then moved to a calibration point on the drawing. Such a calibration point may be any desired location, but in many applications it is desirable that the calibration point be the greatest distance from the origin. In this example, the calibration point is 50 inches from the origin along the X axis and 40 inches from the origin along the Y axis as shown in FIGURE 1. As the stylus is moved to the calibration point, the X and Y position potentiometers move upward, as viewed in FIGURE 3, so their taps have a greater voltage. When the stylus is positioned at the calibration point, the operator knows that the X and Y readout means should respectively indicate 50 and 40 inches. If these respective indications are not shown, the operator knows that the drawing is undersize or oversize. The operator therefore moves the X and Y calibration potentiometers until the indicated stylus position is 50 inches and 40 inches for the X and Y dimensions.

When the X calibration potentiometer is adjusted, it is moved downward, as viewed in FIGURE 3, toward the —.5" end (which represents undersize). This provides a certain magnitude of voltage at a phase angle of 180 degrees. This voltage is supplied to the X position potentiometer and to the X servo. As the X calibration potentiometer is so adjusted, the X servo causes the X motor to rotate in a direction that moves the X reference plate to the left (as viewed in FIGURES 1, 2A, and 2B) so that the 50 inch mark on the X reference plate and the 50 inch reference plate code coincide with the stylus position at the calibration point. In a similar manner, the Y calibration potentiometer is moved upward, as viewed in FIGURE 3, toward the +.5" end (which represents oversize). This provides a certain magnitude of voltage at a phase angle of zero degrees. This voltage is supplied to the Y position potentiometer and to the Y servo. As the Y calibration potentiometer is so adjusted, the Y servo causes the Y motor to rotate in a direction that moves the Y reference plate upward (as viewed in FIGURE 1) so that the 40 inch mark on the Y reference plate and the 40 inch reference plate code coincide with the stylus position at the calibration point. After this adjustment, the device is calibrated. The calibration points for these conditions are shown in the graphs of FIGURE 5. Since the calibration potentiometers produce a maximum of 10 volts (for the maximum oversize or undersize of 0.5 inch), the X calibration point is at the indicated distance of 50 inches and 0.5 inch undersize. This provides an X sensing head voltage of 10 volts at 180 degrees. The Y calibration point is at the indicated distance of 40 inches and 0.25 inch oversize. This provides a Y sensing head voltage of 5 volts at zero degrees. The graphs are drawn from the respective calibration points to the zero drawing distance and the zero output voltage.

With the device calibrated, as the operator moves the stylus to various positions, the X and Y motors move the X and Y reference plates accordingly so that the X and Y readout means indicate the true and intended position of the stylus. As the stylus is moved to these various positions the reference plates and the output voltages of the sensing heads vary as indicated by the graphs. For example, assume that the stylus is positioned at the indicated point in FIGURE 5 which is 10.5 inches along both axes from the blade and drawing origin. For the undersized X dimension, the X reference plate moves to the left by approximately 0.1 inch and the Y reference plate moves upward by approximately 0.06 inch. The effect of the X reference plate moving to the left is that its indicated or sensed position is slightly higher, which it should be for an undersized X dimension. The effect of the Y reference plate moving upward is that its indicated or sensed position is slightly lower, which it should be for an oversized Y dimension. The motion of the reference plates is accomplished by the sensing head output voltages changing. For the Y axis, the output voltage changed from 4 volts to 1.3 volts, and for the X axis, the output voltage changed from 10 volts to 2.1 volts.

The condition at the 10.5 inch example is illustrated in greater detail for the X dimension in FIGURES 2A and 2B. These figures show the drawing origin and indicate that the distance from the origin to a point is shown on the drawing as being 10.5 inches. Actually, if this distance were measured off it would be somewhat less, approximately 10.4 inches, because the X dimension is undersize. Therefore, in order that the true and intended position be indicated, the X reference plate was moved to the left by 0.1 inch, this being indicated by the distance between the zero inch mark on the X reference plate and the origin. This movement of the X reference plate to the left causes the X readout means to indicate the true and intended position of 10.5 inches. In a similar manner, the Y reference plate is moved upward so that the true and intended position of the Y readout means and the stylus in the Y dimension is at 10.5 inches. Finally, it will be seen that the information converting device of the invention makes an initial calibration based on undersize or oversize at the maximum dimensions, and then provides a linear adjustment of the undersize or oversize at points between zero and the maximum dimension. For most applications, the linear adjustment is proper because the oversize or undersize usually varies linearly between zero and the maximum dimension.

Other embodiments

The rack teeth, and the associated drive gear for the position potentiometers, were provided with teeth on 0.1 inch centers for several reasons. One is to provide definite tenth inch reference points to receive a locking pin when the operator depresses the stylus against the drawing. This insures that the stylus is positioned accurately, and gives the operator a positioning tolerance of plus or minus 0.05 inch in which the stylus will be brought back to the nearest proper dimension. And with this locking device, the readout means is properly positioned with respect to the reference plate codes. While teeth spaced on 0.1 inch centers have been shown, other spacings may be utilized.

The information converting device of the invention may also be utilized where true and intended information is to be converted into actual information. For example, assume that the programming device described above has been used to prepare a punched paper tape. This tape will indicate the true and intended positions of an object such as a drill which moves relative to a printed circuit board. However, assume that the printed circuit board has shrunk or is improperly dimensioned for some reason. If the printed circuit board has been etched, it is desirable that the component holes be drilled in the printed circuit board at the centers of the metallic areas rather than at the absolute dimensions indicated on the punched paper tape. The invention can be used to convert the true and intended information on the punched paper tape to actual dimensions relative to the printed circuit board so that the operations performed on the printed circuit board are at the desired positions as determined by the actual dimensions of the printed circuit board and not by the true and intended dimensions on the punched paper tape. This can be achieved by the machine tool control having its feedback or position transducers driven on the basis of an adjustable reference plate. The adjustable reference plate can be moved in accordance with whether the part being operated or worked on is undersize or oversize, and can be adjusted for all dimensions or positions between the origin and the maximum excursion. The printed circuit board and machine origins would be made coincident, and the machine would be moved to the maximum dimension of the printed circuit board. The operator would adjust the calibration potentiometers so that the maximum dimension indicated on the punched tape coincides with the maximum dimension of the printed circuit board. Thereafter, the information converting device in accordance with the invention would adjust the reference plate in both dimensions so that as the machine tool control moved back and forth, it would come to rest at a position which satisfies the actual dimensions of the printed circuit board and the true and intended dimensions of the command supplied to the machine tool control. This result is achieved because the reference plates are moved, and as they are moved they cause the machine tool feedback devices to indicate the true and intended commanded position at the actual position on the printed circuit board.

Conclusion

While only one embodiment of the invention has been shown and described in detail, other embodiments can be provided. For example, the invention can be used with a single axis programming device, or with a three axis programming device and a model. Further, it is not necessary that the axes be perpendicular. In addition, various scales of drawings or models can be used in addition to the true or full size scale drawing indicated. If different scales are used, appropriate circuits can be coupled to the readout means to convert these scales to any desired dimension. Therefore, while the invention has been described with reference to a particular embodiment, it is to be understood that modifications may be made without departing from the spirit of the invention or from the scope of the claims.

What I claim as new and desire to secure by Letters Patent of the United States is:

1. A device for converting information in a first form to information in a second form, one of said information forms being the actual position of an object relative to a reference point and the other of said information forms being the intended position of said object relative to said reference point, comprising an adjustable reference element adapted to provide position information; means for producing a calibration signal having a value indicative of the maximum error between said first and second forms of information; means for producing a position signal having a value equal to said calibration signal multiplied by the relative position of said object and said reference point; and means coupled to said position signal producing means and to said adjustable reference element for adjusting said reference element in response to said position signal.

2. A device for converting information in a first form to information in a second form, one of said information forms being the actual position of an object relative to a reference point and the other of said information forms being the intended position of said object relative to said reference point, comprising an adjustable reference element adapted to provide position information; a calibration element for producing a calibration signal having a value indicative of the maximum error between said first and second forms of information; means coupled to said calibration element for modifying said calibration signal in accordance with the relative position of said object and said reference point; a feedback element coupled to said reference element for producing a feedback signal having a value indicative of the adjustment of said reference element; and means coupled to said feedback element and to said modifying means for adjusting said reference element in response to the relative magnitudes of said modified calibration signal and said feedback signal.

3. A device for converting information in a first form to information in a second form, one of said information forms being the actual position of an object relative to a reference point and the other of said information forms being the intended position of said object relative to said reference point, comprising an adjustable reference element adapted to provide position information; adjusting means coupled to said reference element; a calibration element for producing a calibration signal having a value indicative of the maximum error between said first and second forms of information; a position transducer associated with said object; means coupling said position transducer to said calibration element so that said position transducer produces a position signal having a value determined by the product of said calibration signal and the relative position of said object and said reference point; a feedback element coupled to said adjusting means for producing a feedback signal having a value indicative of the adjustment of said reference element; and means coupled to said feedback element and to said position transducer for operating said adjusting means in response to the relative values of said position signal and said feedback signal.

4. A device for converting the actual position of an object relative to a reference point to information indicating the intended position of said object relative to said reference point, comprising an adjustable reference element adapted to produce true dimension information; adjusting means coupled to said reference element; a calibration element for producing a calibration signal having a value indicative of the maximum error between said actual position and said intended position; a position transducer associated with said object; means coupling said position transducer to said calibration element so that said position transducer produces a position signal having a value indicative of said calibration signal modified by the relative position of said object and said reference point; a feedback element coupled to said adjusting means for producing a feedback signal having a value indicative of the adjustment of said reference element; means coupled to said feedback element and to said position transducer for operating said adjusting means in response to the relative values of said feedback signal and said position signal; and means coupled to said reference element for deriving said information indicating the intended position of said object.

5. A device for converting information indicating the intended position of an object relative to a reference point to information indicating the actual position of said object relative to said reference point, comprising an adjustable reference element adapted to provide dimension information; adjusting means coupled to said reference element; a calibration element for producing a calibration signal having a value indicative of the maximum error between said actual position and said intended position; a position transducer associated with said object; means coupling said position transducer to said calibration element so that said position transducer produces a position signal having a value indicative of said calibration signal as modified by the relative position of said object and said reference point; a feedback element coupled to said adjusting means for producing a feedback signal having a value indicative of the adjustment of said reference element; means coupled to said feedback element and to said position transducer for operating said adjusting means in response to the relative values of said feedback signal and said position signal; and an additional position transducer associated with said reference element for deriving said information indicating the actual position of said object.

6. In a programming device for converting one or more physical dimensions of an object relative to a reference point to corresponding intended dimensions of said object relative to said reference point, the improvement comprising a movable plate having true dimensions thereon; adjusting means coupled to said movable plate; a calibration element for producing a calibration signal having a magnitude indicative of the maximum error between said physical dimensions and said intended dimensions and having a sense indicative of the larger of said dimensions; a locator movable along said dimensions with respect to said reference point; a position transducer associated with said locator; means coupling said position transducer to said calibration element so that said position transducer produces a position signal having a magnitude and sense determined by said calibration signal multiplied by the relative position of said locator from said reference point; a feedback element coupled to said adjusting means for producing a feedback signal having a magnitude indicative of the adjustment of said reference element and having a sense indicative of the direction of said adjustment; and servo control means coupled to said feedback element and to said position transducer for operating said adjusting means to move said movable plate in accordance with the magntiudes and sense of said feedback signal and said position signal.

7. A control for converting information that indicates intended dimensions along each axial dimension of an object into information modified in accordance with the maximum deviations of the actual object dimensions from said intended dimensions comprising:

a respective adjustably positionable reference element provided for each axis for producing dimensional information depending upon its positioning, a respective feedback element coupled to each reference element for producing a corresponding feedback signal that indicates the positional adjustment of said reference element, means for adjusting each reference element in the proper sense for the maximum deviation between the intended dimension of the object from a reference point and the actual dimensions of the object from said reference point to produce respective calibartion signals for each axis, means for producing modified signals indicating the value of each calibration signal as modified by the various, respective relative axial dimensions of the object from said reference point, a servo device responsive to each of said feedback signals and an associated modified signal for adjusting the position of said reference element along each axis.

8. A control for converting information that indicates intended positions along each axis of an object into information modified in accordance with the maximum deviations of the actual object dimensions from said intended positions comprising:

a respective adjustably positionable reference element provided for each axis for producing positional information depending upon its positioning, means for adjusting each reference element in the proper sense for the maximum deviation between the intended position of the object from a reference point and the actual position of the object from said reference point to produce a respective calibration signal for each axis, means for producing modified signals indicating the value of each calibration signal as modified by the various respective relative axial positions of the object from said reference point, means responsive to each of said modified signals for adjusting the position of said reference element along each axis.

References Cited

UNITED STATES PATENTS

| | | | |
|---|---|---|---|
| 2,937,325 | 5/1960 | Garber | 318—28 |
| 2,996,348 | 8/1961 | Rosenberg | 318—19 |
| 3,031,766 | 5/1962 | Schulte | 318—30 |
| 3,073,998 | 1/1963 | Bower | 318—162 |
| 3,176,120 | 3/1965 | Whitemore et al. | 318—28 |
| 3,188,541 | 6/1965 | Eisengrein et al. | 318—162 |

BENJAMIN DOBECK, *Primary Examiner.*

UNITED STATES PATENT OFFICE
CERTIFICATE OF CORRECTION

Patent No. 3,394,291                                    July 23, 1968

Harold P. Hill

It is certified that error appears in the above identified patent and that said Letters Patent are hereby corrected as shown below:

Column 2, line 37, "dimension" should read -- dimensions --. Column 3, line 36, "read out" should read -- readout --. Column 7, line 10, "blade" should read -- table --; line 14, "eflect" should read -- effect --.

Signed and sealed this 13th day of January 1970.

(SEAL)
Attest:

Edward M. Fletcher, Jr.
Attesting Officer

WILLIAM E. SCHUYLER, JR.
                                                Commissioner of Patents